US008550920B1

(12) United States Patent
Allen et al.

(10) Patent No.: US 8,550,920 B1
(45) Date of Patent: Oct. 8, 2013

(54) PROVIDING AND CONTROLLING EMBEDDABLE GAMING CONTENT

(75) Inventors: Jeffrey L. Allen, Naperville, IL (US); Danijel Stankovic, Evanston, IL (US); John R. Werneke, Naperville, IL (US)

(73) Assignee: WMS Gaming, Inc., Waukegan, IL (US)

( * ) Notice: Subject to any disclaimer, the term of this patent is extended or adjusted under 35 U.S.C. 154(b) by 193 days.

(21) Appl. No.: 13/113,563

(22) Filed: May 23, 2011

Related U.S. Application Data

(60) Provisional application No. 61/349,729, filed on May 28, 2010.

(51) Int. Cl.
*G06F 17/00* (2006.01)

(52) U.S. Cl.
USPC .................................. 463/42; 463/29; 463/25

(58) Field of Classification Search
USPC ................................................ 463/42, 29, 25
See application file for complete search history.

(56) References Cited

U.S. PATENT DOCUMENTS

| | | | | |
|---|---|---|---|---|
| 2006/0111169 | A1 | 5/2006 | Hornik et al. | |
| 2007/0088852 | A1 * | 4/2007 | Levkovitz | 709/246 |
| 2008/0009344 | A1 * | 1/2008 | Graham et al. | 463/25 |
| 2008/0064488 | A1 * | 3/2008 | Oh | 463/25 |
| 2008/0300049 | A1 | 12/2008 | Anderson et al. | |
| 2009/0054136 | A1 | 2/2009 | Gagner et al. | |
| 2009/0094339 | A1 * | 4/2009 | Allen et al. | 709/206 |
| 2009/0113346 | A1 * | 4/2009 | Wickramasuriya et al. | 715/825 |
| 2009/0117989 | A1 | 5/2009 | Arezina et al. | |
| 2009/0156299 | A1 | 6/2009 | Anderson et al. | |
| 2009/0156304 | A1 | 6/2009 | Ryan | |
| 2010/0004055 | A1 * | 1/2010 | Gormley et al. | 463/25 |
| 2010/0029380 | A1 * | 2/2010 | Rhoads et al. | 463/29 |
| 2010/0063892 | A1 | 3/2010 | Keronen et al. | |
| 2010/0100605 | A1 * | 4/2010 | Allen et al. | 709/217 |
| 2010/0184505 | A1 | 7/2010 | Bryson et al. | |
| 2010/0317424 | A1 | 12/2010 | Hornik et al. | |
| 2011/0053672 | A1 * | 3/2011 | Gagner et al. | 463/16 |
| 2011/0179116 | A1 * | 7/2011 | Solomon et al. | 709/204 |
| 2011/0300926 | A1 * | 12/2011 | Englman et al. | 463/25 |
| 2012/0028718 | A1 * | 2/2012 | Barclay et al. | 463/42 |

FOREIGN PATENT DOCUMENTS

| | | |
|---|---|---|
| WO | WO2008028234 | 3/2008 |
| WO | WO2009005657 | 1/2009 |
| WO | WO2009009269 | 1/2009 |
| WO | WO2010085285 | 7/2010 |

* cited by examiner

*Primary Examiner* — Michael Cuff
(74) *Attorney, Agent, or Firm* — DeLizio Gilliam, PLLC

(57) ABSTRACT

A wagering game system and its operations are described herein. In embodiments, the operations can include detecting a request to login a player account via a widget embedded in host content. The operations can further include detecting a selection of a wagering game theme, via the widget, for a wagering game that the player account has previously played and presenting a collection of widget content that the player account is authorized to access, via the widget, based on statistics, playing history, achievements, etc. of the wagering game. The operations can further include detecting a selection of a non-wagering game from the collection of widget content and providing a non-wagering game via the widget. The operations can further include providing customized information for a host and/or the player account via the widget based on statistics from the wagering game content or from the widget content.

26 Claims, 11 Drawing Sheets

PROVIDING AND CONTROLLING EMBEDDABLE GAMING CONTENT

RELATED APPLICATIONS

This application claims the priority benefit of U.S. Provisional Application No. 61/349,729 filed May 28, 2010.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

TECHNICAL FIELD

Embodiments of the inventive subject matter relate generally to wagering game systems and networks that, more particularly, provide and control embeddable gaming content.

BACKGROUND

Wagering game machines, such as slot machines, video poker machines and the like, have been a cornerstone of the gaming industry for several years. Traditionally, wagering game machines have been confined to physical buildings, like casinos (e.g., resort casinos, road-side casinos, etc.). The casinos are located in specific geographic locations that are authorized to present wagering games to casino patrons. However, with the proliferation of interest and use of the Internet, shrewd wagering game manufacturers have recognized that a global public network, such as the Internet, can reach to various locations of the world that have been authorized to present wagering games. Any individual with a personal computing device (e.g., a personal computer, a laptop, a personal digital assistant, a cell phone, etc.) can connect to the Internet and play wagering games. Consequently, some wagering game manufacturers have created wagering games that can be processed by personal computing devices and offered via online casino websites ("online casinos"). However, online casinos face challenges and struggles. For instance, online casinos have struggled to provide the excitement and entertainment that a real-world casino environment provides. Some online casinos have struggled enforcing cross jurisdictional restrictions and requirements. Further, some online casinos have struggled adapting the online gaming industry to a traditionally non-wagering game business environment. As a result, wagering game manufacturers, casino operators, and online game providers are constantly in need of innovative concepts that can make the online gaming industry appealing and profitable.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
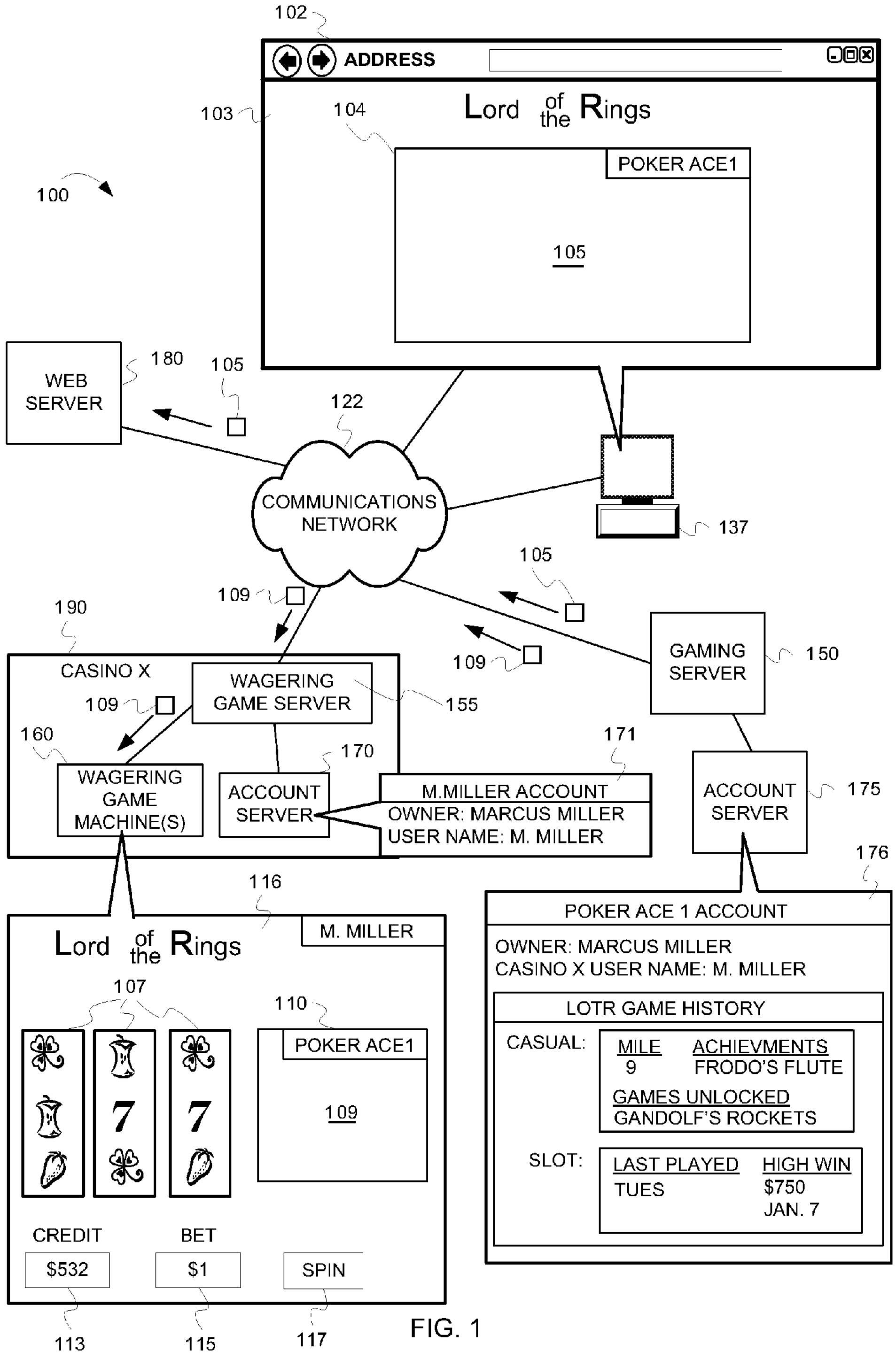
FIG. 1 is an illustration of providing game content via gaming widgets, according to some embodiments.

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

A widget is a stand-alone, dynamic application that provides a first content that can be included in or embedded into second content provided by a host. The widget's content may be referred to as "widget content" and the host's content, into which the widget content is embedded, may be referred to as "host content." Widgets can be created by a first entity that provides, or generates, the widget content. The first entity may be a business entity that specializes in the widget content. The first entity may also provide the widget or may distribute the widget to other entities to distribute. The host may be a computer system that belongs to a separate entity from the first entity, such as a business entity that runs a website. The host content, therefore, may include a website that is served, or hosted, by a computer with a web server ("web server"). The host (e.g., the web server) can provide a web document (e.g., a web page, a blog, a social media site profile, etc.) associated with the website. A user that has rights of authorship for the web document can embed the widget into the web document. Widgets embedded into web documents are sometimes referred to as web widgets. A web user, or a user that visits the host website, can request the web document using a web browser application ("browser"). When the web document loads into the browser, the browser displays webpage content that includes the widget. The webpage content can include other host content in addition to the widget. The widget, therefore, provides a portion of host content for the webpage so that the host (e.g., the web server) or the entity that owns the host (e.g., the webpage provider) does not have to generate or maintain the widget content. The host may also be a personal, or local (non-server), computer system or an operating system for a computer system. For example, a computer can present a widget embedded into the computer's desktop or into another application stored locally on the computer. Widgets embedded on personal or local computer systems are sometimes referred to as desktop widgets.

The host does not typically control the widget content. The widget content and/or the functionality the widget provides cannot typically be modified by the host. Thus, the host can either present the widget content or not use the widget. The host does however control the placement of the widget. However, a user who has rights to the host can remove the widget from the host content, such as from a webpage or a computer desktop. Further, widget content can be processed as server-side content, or content that is processed by a server that belongs to the widget's provider. Thus, widgets can reduce the need to store some content on host computers and/or reduce performance issues for host systems and networks. Widgets, therefore, can be very useful, cost-effective, resource efficient, and easily maintainable applications for host entities.

FIG. 1 is a conceptual diagram that illustrates an example of providing game content via gaming widgets, according to some embodiments. In FIG. 1, a wagering game system ("system") 100 includes a gaming server 150 that provides a gaming service. The gaming server 150 is connected to a communications network 122. A web server 180 and a wagering game server 155 are also connected to the communications network 122. The wagering game server 155 is part of a casino network 190, which also includes one or more wagering game machine(s) 160 and an account server 170 connected to the wagering game server 155. In some embodiments, the web server 180 is also part of the casino network 190 or is controlled or associated with a casino entity that controls or is associated with the casino network 190. The account server 170 stores player accounts that access and play wagering games on the wagering game machine(s) 160, such as first player account 171 (e.g., a casino player account related to tracking card system). The gaming server 150 is connected to a second account server 175. The second account server 175 stores a second player account 176 that can access first content 105 (e.g., non-wagering game content, such as casual games that do not require wagering) in a first gaming widget 104 (e.g., a web widget), which the gaming server 150 provides to the web server 180 via the communications network 122. The web server 180 provides a webpage 103 that a player, associated with the second player account 176, can access via a browser 102 presented by a computer system ("computer") 137. The first gaming widget 104 is embedded in the webpage 103.

The gaming server 150 associates, or links, the first player account 171 and the second player account 176 and tracks wagering game statistics (e.g., activity, history, achievements, etc.) and non-wagering game statistics for both the first player account 171 and the second player account 176. The gaming server 150 stores wagering game statistics of one or more wagering games that the wagering game machine(s) 160 present during one or more wagering game sessions in the casino network 190 for the first player account 171. The gaming server 150 also tracks and stores non-wagering game statistics of one or more non-wagering games that the first gaming widget 104 presents during one or more non-wagering game sessions outside the casino network 190 for the second player account 176. The gaming server 150, however, can link, store, data mine, analyze, or otherwise use or associate the wagering game statistics and non-wagering game statistics. For example, the gaming server 150 stores non-wagering game history and wagering game history in, or in association with, the second player account 176 (e.g. stored in a database record associated with the second player account 176, stored in separate but related or linked database records associated with the second player account 176 and the first player account 171, etc.). For example, the first player account 171 and the second player account 176 may be controlled, or owned, by the same player or entity. In some embodiments, the first player account 171 can be controlled by, linked with, owned by, etc., a casino, a game provider, a third party, etc. The player selects, or is assigned, a first user name (i.e., "M. Miller") for the first player account 171. The player also selects, or is assigned, a second user name (i.e., "Poker Ace 1") for the second player account 176. The gaming server 150 associates the two accounts together, and, therefore, associates the two user names and stores the association, for example, in the second player account 176.

In some embodiments, the gaming server 150 can also provide a second gaming widget 110 to the wagering game server 155 to present via a graphical user interface 161 for the wagering game machine(s) 160. The graphical user interface 161 also presents wagering game content, such as slot reels 107, a credit meter 113, a bet meter 115, and a spin control 117. The second gaming widget 110, when presented in the graphical user interface 161 can present second content 109 in addition to, or instead of, the first content 105. The second content 109 may be wagering game content, such as secondary wagering games, or non-wagering game content, such as casual games that do not require wagering.

The first gaming widget 104 or the second gaming widget 110 can receive login information for the second player account 176, at different times, and provide a game session (e.g. either a wagering game session or non-wagering game session) for the second player account 176 via the first gaming widget 104 or the second gaming widget 110. The gaming server 150 provides the first content 105 for the first gaming widget 104 and the second content 109 for the second gaming widget 110. Therefore, the wagering game server 155 or the web server 180 can utilize the first gaming widget 104 or the second gaming widget 110 without having to host the first content 105 or the second content 109.

Further, some embodiments of the inventive subject matter describe examples of providing and controlling embeddable gaming content in a network wagering venue (e.g., an online casino, a wagering game website, a wagering network, etc.) using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
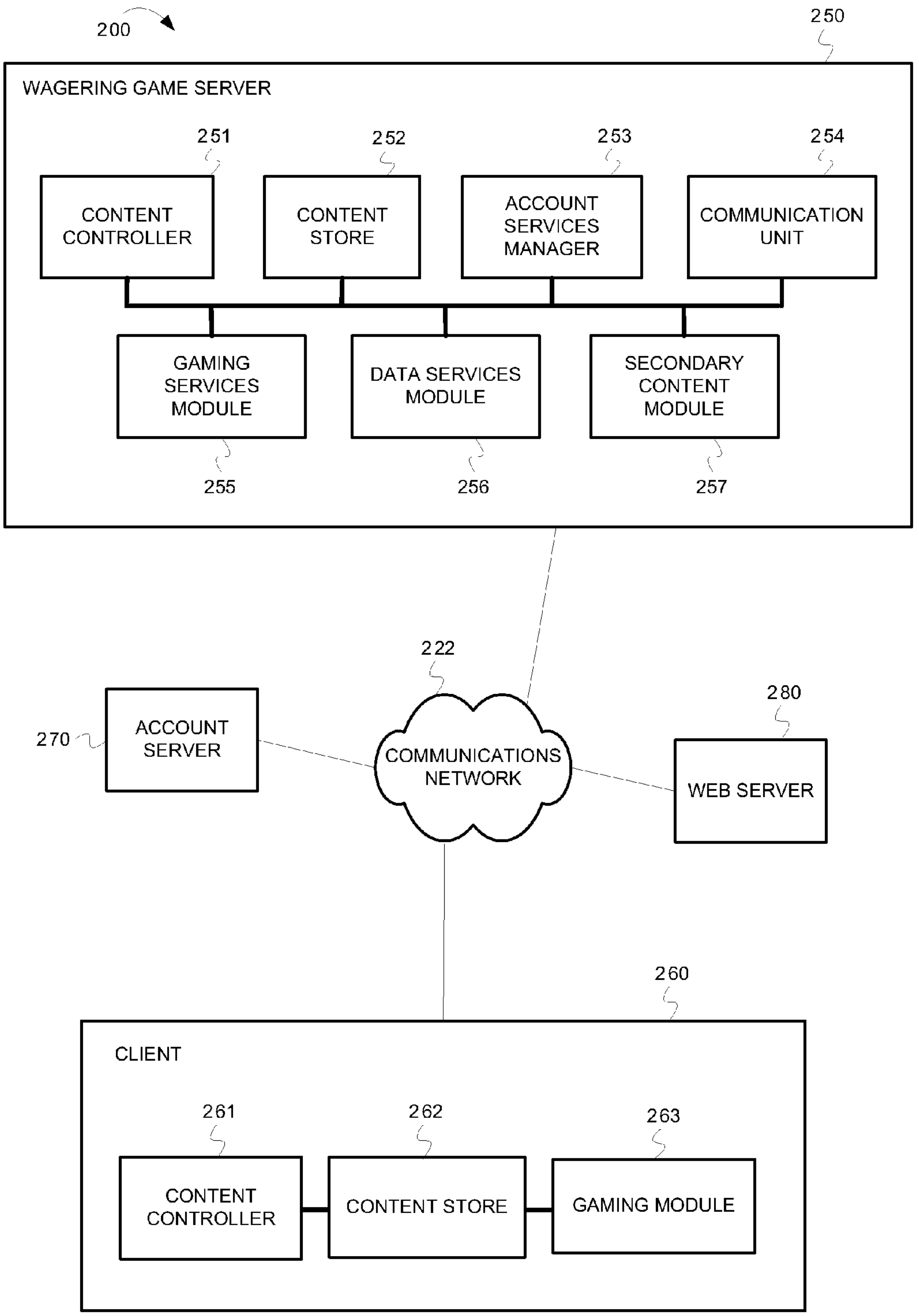
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networking networks. The account server 270 can store wagering game player account information, such as account settings (e.g., settings related to wagering games and non-wagering games, settings related to social contacts, etc.), preferences (e.g., player preferences regarding secondary content, player preferences regarding award types, player preferences related to virtual assets, etc.), player profile data (e.g., name, avatar, screen name, etc.), and other information for a player's account (e.g., financial information, account identification numbers, virtual assets, social contact information, etc.). The account server 270 can contain lists of social contacts referenced by a player account. The account server 270 can also provide auditing capabilities, according to regulatory rules. The account server 270 can also track performance of players, machines, and servers.

The wagering game system architecture 200 can also include a gaming server 250 configured to control wagering game content, provide random numbers, and communicate wagering game information, account information, and other information to and from a client 260. The gaming server 250 can include a content controller 251 configured to manage and control content for the presentation of content on the client 260. For example, the content controller 251 can generate game results (e.g., win/loss values), including win amounts, for games played on the client 260. The content controller 251 can communicate the game results to the client 260. The content controller 251 can also generate random numbers and provide them to the client 260 so that the client 260 can generate game results. The gaming server 250 can also include a content store 252 configured to contain content to present on the client 260 such as via a gaming widget embedded on the client, via a web browser, etc. The gaming server 250 can also include an account services manager 253 configured to control information related to player accounts, link player accounts, use information from separate player accounts, etc. For example, the account services manager 253 can communicate wager amounts, game results amounts (e.g., win amounts), bonus game amounts, etc., to the account server 270. In some embodiments, the account services manager 253 can communicate game progress in a non-wagering game. In some embodiments, the accounts services manager 253 can also communicate wagering game information and non-wagering game information to a marketing server to generate promotions, advertisements, rewards, etc. associated with gaming and non-gaming content. The gaming server 250 can also include a communication unit 254 configured to communicate information to the client 260 and to communicate with other systems, devices and networks. The gaming server 250 can also include a gaming services module 255 configured to provide, track, store, use, or control gaming content and non-gaming content in a gaming widget. The gaming server 250 can also include a data services module 256 configured to provide data storage, data mining, data reporting, and other data related services. The gaming server 250 can also include a secondary content module 257 configured to provide content and control information for secondary games and other secondary content (e.g., secondary wagering game content, promotions content, advertising content, player tracking content, web content, etc.). The secondary content module 257 can provide "secondary" content, or content for "secondary" games presented on the client 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa.

The wagering game system architecture 200 can also include a web server 280 configured to control and present an online website that hosts wagering games and other content. The web server 280 can also be configured to present multiple wagering game applications on the wagering game machine 260 via a wagering game website, or other gaming-type venue accessible via the Internet. The web server 280 can host an online wagering website and/or a social networking website. The web server 280 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The web server 280 can also be configured to present web documents (e.g., web pages) with embedded gaming widgets.

The wagering game system architecture 200 can also include the client 260 configured to present wagering games and receive and transmit information to provide and control embeddable gaming content. The client 260 can be a computer system, a personal digital assistant (PDA), a cell phone, a laptop, a wagering game machine, or any other device or machine that is capable of processing information, instructions, or other data provided via the communications network 222. The client 260 can include a content controller 261 configured to manage and control content and presentation of content on the client 260. The client 260 can also include a content store 262 configured to contain content to present on the client 260. The client 260 can also include a gaming module 263 configured to present and control a gaming widget and provide other gaming services provided by the gaming server 250.

Each component shown in the wagering game system architecture 200 is shown as a separate and distinct element connected via a communications network 222. However, some functions performed by one component could be performed by other components. For example, the gaming server 250 can also be configured to perform functions of the client 260 and other network elements and/or system devices. Furthermore, the components shown may all be contained in one device, but some, or all, may be included in, or performed by, multiple devices, as in the configurations shown in FIG. 2 or other configurations not shown. For example, the account services manager 253 and the communication unit 254 can be included in the client 260 instead of, or in addition to, being a part of the gaming server 250. Further, in some embodiments, the client 260 can determine wagering game outcomes, generate random numbers, etc. instead of, or in addition to, the gaming server 250.

As mentioned previously, in some embodiments, the client 260 can take the form of a wagering game machine. Examples of wagering game machines can include floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, clients and wagering game servers work together such that clients can be operated as thin, thick, or intermediate clients. For example, one or more elements of game play may be controlled by the client or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the clients can present a graphical representation of such outcome or asset modification to the user (e.g., player). In a thick-client example, the clients can determine game outcomes and communicate the outcomes to the wagering game server for recording or managing a player's account.

In some embodiments, either the client or the wagering game server(s) can provide functionality that is not directly related to game play. For example, account transactions and account rules may be managed centrally (e.g., by the wagering game server(s)) or locally (e.g., by the client). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
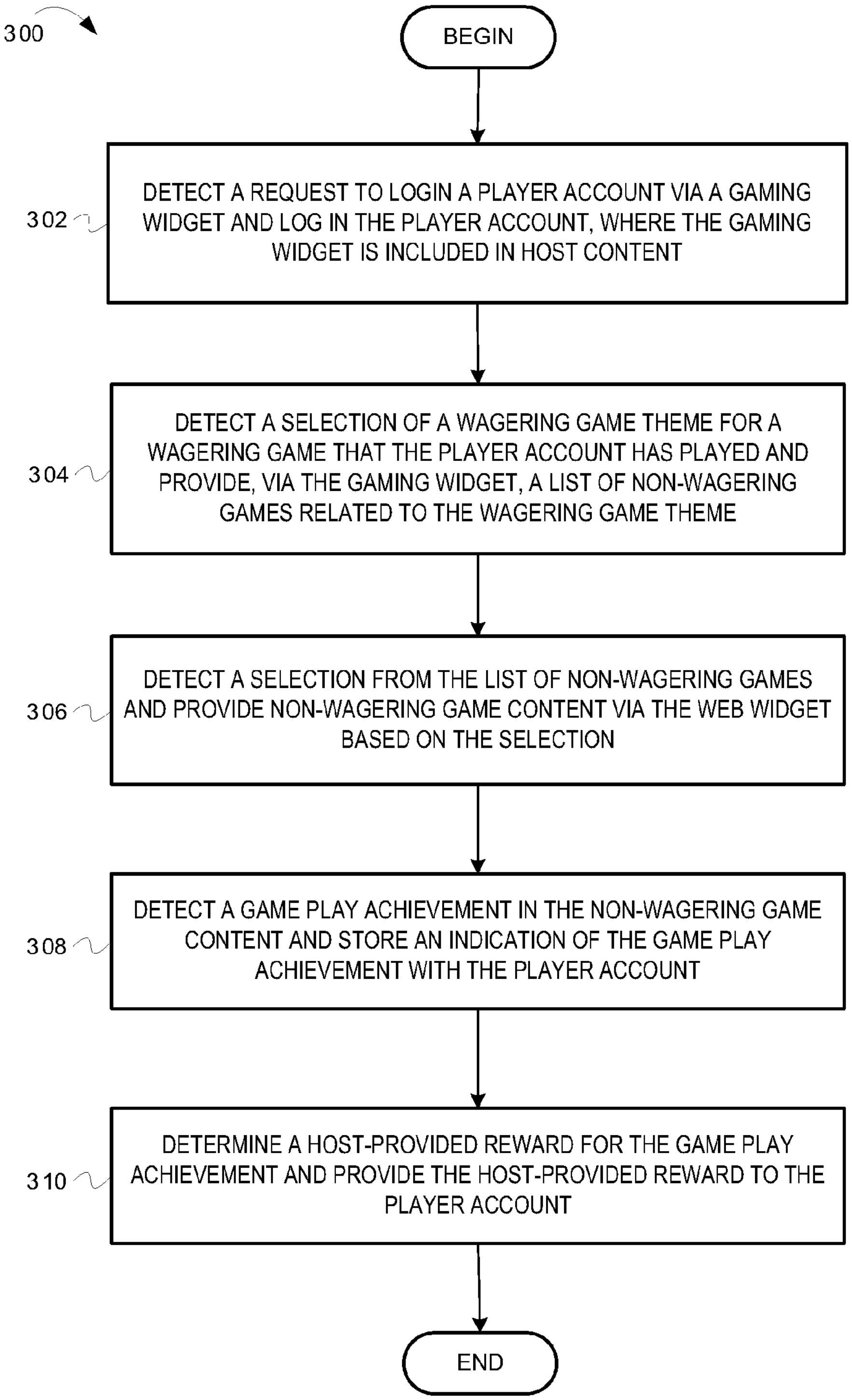
FIG. 3 is a flow diagram 300 illustrating providing content via a gaming widget, according to some embodiments.

FIG. 3 is a flow diagram ("flow") 300 illustrating providing content via a gaming widget, according to some embodiments. FIGS. 4, 5, 6 and 7 are conceptual diagrams that help illustrate the flow of FIG. 3, according to some embodiments. This description will present FIG. 3 in concert with FIGS. 4, 5, 6 and 7.

In FIG. 3, the flow 300 begins at processing block 302, where a wagering game system ("system") detects a request to login a player account via a gaming widget and logs in the player account, where the gaming widget is included in host content. For instance, similar to FIG. 1, the gaming web widget can be installed, embedded, inserted, etc. into a host webpage as a web widget or into a host wagering game machine as a desktop widget. In some embodiments, the wagering game machine may utilize web browsers to present content. Thus, the gaming widget may be embedded as a web widget in a wagering game machine's browser. The host can present the gaming widget, but the gaming widget runs on a service connected to a gaming server that is external to and separate from the host network (e.g., an online gaming server that provides the service via the Internet). The gaming server can serve all game content through the gaming widget. In some embodiments, the gaming widget can be downloaded and installed using a plug-in. In other embodiments, the gaming widget can be embedded using code chunks in a webpage. The gaming widget, however, looks and acts like a traditional application, but it is embedded in the host content and, therefore, functions separately from the host content, as described previously. The gaming widget can be implemented using web technologies including JavaScript, Flash, HTML and CSS. The gaming widgets can use web application programming interfaces (APIs) that can be exposed by the browser, by a widget engine, etc. As described previously, the gaming widget can be embedded in a web document, such as a webpage document. A webpage document can include web document code such as hypertext markup language (HTML), extensible markup language (XML), C#, PHP, JavaScript, AJAX, etc. The webpage document can be an HTML document (e.g., have an ".HTML" or ".HTM" file extension), an Active Server Page or Microsoft™ ASP.NET document (e.g., a webpage document with an ".ASP" file extension), an open source document (e.g., a webpage document with a .PHP file extension), etc.

Figure 4:
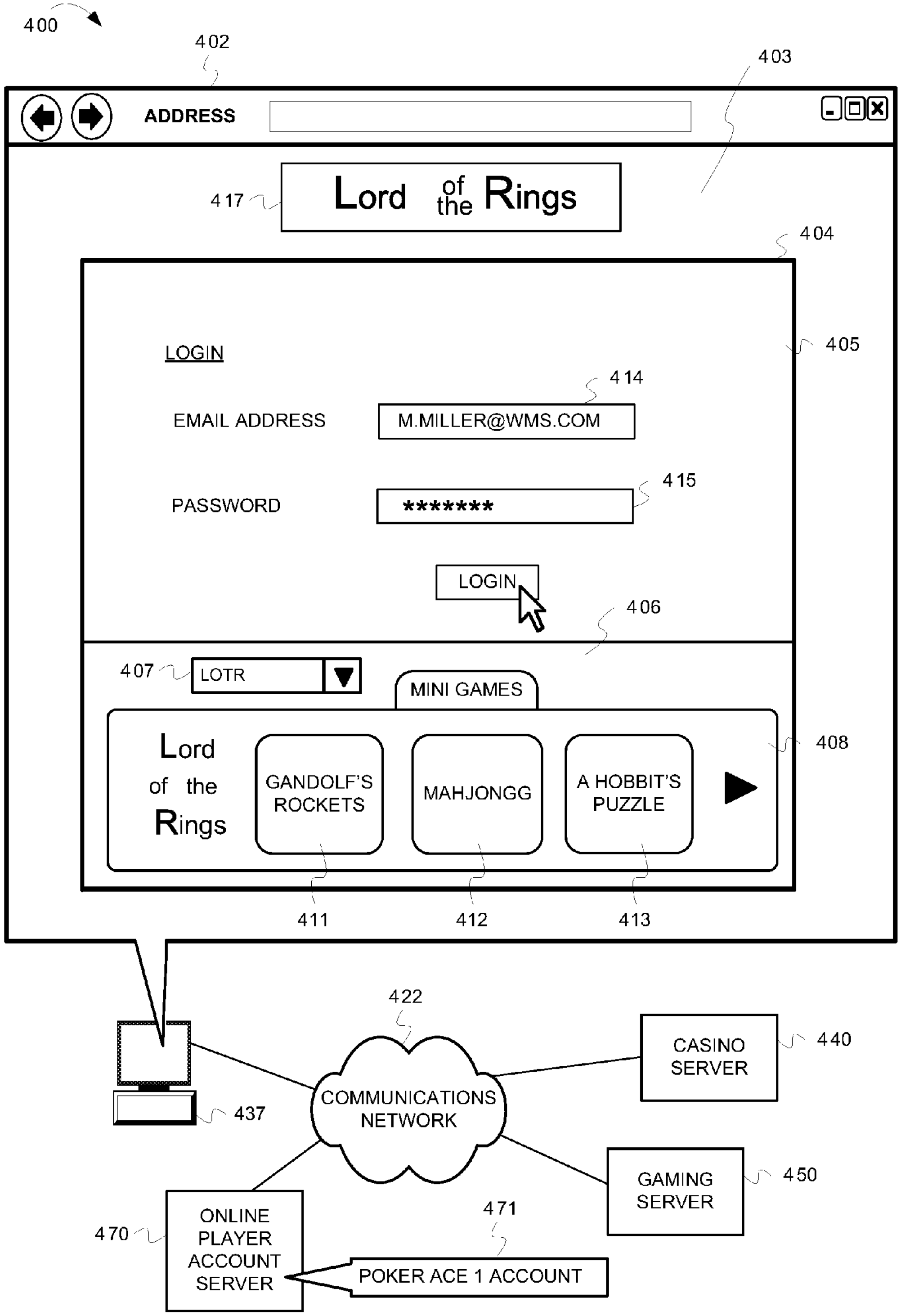
FIGS. 4, 5, 6 and 7 are illustrations of providing gaming and non-wagering game content via a gaming widget embedded in a webpage, according to some embodiments.
Figure 5:
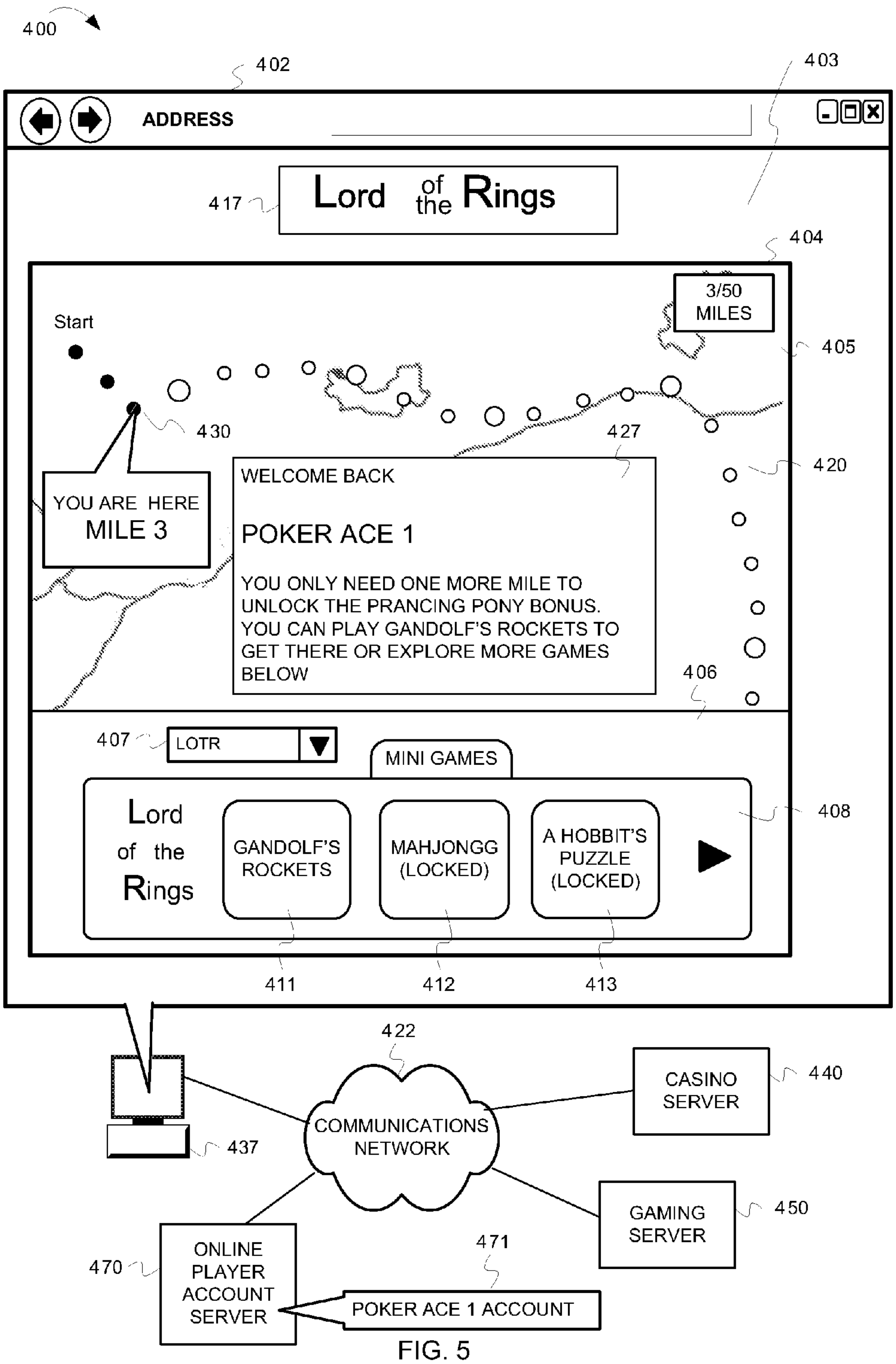

In some embodiments, the system can detect, via user access from a casino webpage, a request to login to a gaming service via a gaming web widget embedded in the casino webpage. The system can receive user login information entered into the gaming web widget after the gaming web widget loads, and login a player account for gaming web widget content. The system can be connected to a host web server (e.g., a casino's web server in/on a casino network) that provides one or more webpages in response to a user request to load the one or more webpages in a browser. The one or more webpages includes a first login control and a gaming web widget with a second login control. The system receives the first login information from the first login control for a first player account. The first player account is stored on a casino account server associated with the casino network. In other words, the casino account server stores information and controls a player account that a player can utilize to play wagering games, to track financial information, to track and redeem player loyalty points for the casino, etc. The system can login the first player account to the casino account server, and can receive first player account information for the first player account from the casino account server. The system can also receive second login information from the second login control for a second player account. The second player account is stored on an online account server associated with an online wagering game service. The system can also provide the second login information to the online account server, via the gaming widget, to login the second player account. The system can receive second player account information for the second player account from the second account server, select content based on the first player account information and the second player account information, and provide the content in the webpage. For instance, the system can present non-wagering game content in the gaming widget for the second player account based on a degree or amount of play in a wagering game stored in, or referenced by, the first player account. FIGS. 4, 5, 6 and 7 illustrate an example. In FIG. 4 a wagering game system ("system") 400 includes a computer 437 connected to a casino server 440, a gaming server 450, and an online player account server 470 via a communications network 422. The computer 437 presents a browser 402 that can access a webpage 403 provided by the casino server 440. Embedded in the webpage 403 is a gaming widget 404. The gaming widget 404 can include a content display 405 and a content navigation console 406. The webpage 403 can include webpage content, such as a graphic 417 that indicates a wagering game theme associated with the webpage 403. The webpage 403 also includes as its content the gaming widget 404, which provides widget content in the content display 405 and in the content navigation console 406. The gaming widget 404 can access a multi-media, game content service ("game content service") provided by the gaming server 450. The gaming widget 404 provides content for multiple game themes. For instance, a player may have played a specific wagering game at a casino prior to accessing the webpage 403 from the computer 437. The webpage 403 is related to a specific wagering game theme, such as a themed game (e.g., "Lord of the Rings" thematic slot game), that the player may have played previously in a casino or online. By playing the themed wagering game in a casino or via online venues, the system 400 tracks the playing activity in the themed wagering game. Based on the playing activity, the system 400 unlocks non-wagering game content that the system 400 can present in the gaming widget 404 when the player visits the webpage 403. The non-wagering game content may only be available when the player visits specific websites, such as the webpage 403, which is part of the casino's website. The webpage 403 includes the graphic 417 (e.g., the Lord of the Rings graphic) that specifically indicates the themed game (i.e., the Lord of the Rings thematic slot game).

The content display 405 presents a login form with an account identifier field 414 and a password field 415. A user can enter a login identifier into the account identifier field 414 and password into the password field 415. The login identifier and password are related to an online player account 471 stored on, or referenced by, the online player account server 470, which is accessible to the gaming server 450. Previous to logging in, the gaming widget 404 can present a registration form for a registration process to create the online player account 471. As part of the registration process, the system 400 can present options for the player to select a specific screen name or user name. In some embodiments, during the registration process, the system 400 can provide a name clearing house service that checks that a requested user name is not already in use. The system 400 can present a service that a player can use to check whether a specific user name is available as a user name for the online player account, for example, to determine if a matching user name for a casino player account is available to use. If a matching user name is already in use, the system 400 can suggest similar names or can provide services that offer the user name to a player account that has a higher player status or that pays a higher fee. Further, as part of the registration process, or thereafter, the system 400 can present options for a player to associate the online player account 471 with one or more casino playing accounts that store data regarding a player's playing statistics or playing history for the specific themed game at one or more casinos or one or more online gaming venues. Previously, on the webpage 403, or on a different location associated with a casino's website, the user can also enter login information for a casino player account associated with the casino or casino server 440 that hosts the webpage 403. The casino server 440 can login the casino player account prior to, or concurrently with, logging in the online player account 471. The gaming server 450 can link together the online player account 471 and the one or more casino player accounts when the player logs in to the online player account 471 via the gaming widget 404. In other words, the system 400 can provide information for the online player account 471 to the casino server 440. Further, the system 400 can receive information for the casino player account from the casino server 440 and provide the information to the gaming server 450. Therefore, when a player logs on to a casino website, or to a casino game at a wagering game machine, the casino can link the player's casino account to the online player account 471. The casino then has the linked information as well as game statistics and playing history for gaming widget games, and can use the information for selecting bonuses, for providing advertisements, etc. For example, when a player logs in to a casino player account through the casino website or on a wagering game machine, the casino knows that the player is Marcus Miller. Then, when the player further logs on to the online player account 471, for which the player Marcus Miller is know by the user name "PokerAce1" the gaming server 450 provides to the casino server 440 the user name "PokerAce1." The gaming server 450 also provides access to playing history, statistics, etc. for the past wagering games and non-wagering games that the online player account 471 has played or that the casino player account has played in other casinos, or online gaming venues, or for other player accounts that have been linked to the online player account 471.

Returning momentarily to FIG. 3, the flow 300 continues at processing block 304, where the system detects a selection of a wagering game theme for a wagering game that the player account has played and provides, via the gaming widget, a list of non-wagering games related to the wagering game theme. In some embodiments, the selection of the wagering game theme can be from the web widget or from the webpage. For instance, in FIG. 4 a player can navigate to the webpage 403 via an Internet hyper link for content specific to the wagering game theme (e.g., a player visits the casino's website and clicks on a link for the Lord of the Rings game theme). In another example, however, still referring to FIG. 4, the system 400 can present a game theme selector 407 that a player can use to select a specific game theme. When a player selects a specific game theme from the game theme selector 407 (e.g., the "LOTR" or "Lord of the Rings" selection), the system 400 can update content within the gaming widget 404, and also update webpage content on the webpage 403, based on the selection of the game theme selector 407. To update content on the webpage 403 based on the selection of the game theme selector 407 the gaming widget 404 can communicate bi-directionally with the casino server 440 and the gaming server 450. For instance, the gaming widget 404 can pass information (e.g., via API) to the casino server 440, or dynamically to the webpage 403 (e.g., via scripting), to update the background, or other elements (e.g., the graphic 417), of the webpage 403 to adapt to the selection of the wagering game theme from the gaming widget 404. In other embodiments, the background, or other elements, of the webpage 403 do not need to update to reflect the selected wagering game theme, but can remain the same (e.g., the webpage 403 can remain generic or present content unrelated to the specific game theme). In embodiments where the game theme selection is not made in the gaming widget 404, the web page 403 or the casino server 440, can pass information (e.g., via API and/or scripting) to the gaming widget 404 and/or to the gaming server 450, that indicates the wagering game theme.

When the wagering game theme is selected, the system 400 presents a listing 408 of multiple persistent-state web-widget games (e.g., non-wagering games, casual games, or "mini-games") in the content navigation console 406. The listing 408, for example, can include a first game selection graphic 411 for a first mini-game (e.g., "Gandalf's Rockets), a second game selection graphic 412 for a second mini-game (e.g., "Mahjongg"), a third game selection graphic 413 for a third mini-game (e.g., "A Hobbits Puzzle"), etc. Each of the mini-games is related to the selected game theme (e.g., each of the mini-games is related to the Lord of the Rings game theme selected in the game theme selector 407). The gaming widget 404 can present the listing 408 in many different ways, such as via tabs, dropdowns, flow charts, diagrams, mind maps, pop-ups, etc. In some embodiments, the listing 408 can show a player's favorite games The mini-games, and other widget content, can be unlocked, or authorized for player access, based on a player's performance or playing history, or statistics, in a wagering game for the selected wagering game theme that the player played during one or more previous wagering game sessions. Access to some, or all, of the widget content (e.g., the mini-games), may depend on, or require, a player account to first attain a level, or threshold, of statistical performance or activity (e.g., attain a threshold statistic) for a wagering game. For example, in FIG. 5, after the system 400 logs in the online player account 471, the system 400 modifies the content navigation console 406 to be player specific. For instance, a portion of the available mini-games in the content navigation console 406 can be deactivated (e.g., locked, grayed out, etc.) based on previous performance (e.g. attaining one or more threshold statistics) in a previous wagering game session. For example, the second game selection graphic 412 (e.g., the "Mahjongg" game) and the third game selection graphic 413 (e.g., the "Hobbit's Puzzle" game) are deactivated, or unauthorized for access, because the online player account 471 has not unlocked the associated mini-game content via wagering game play at a casino or an online gaming venue. Another portion of the available mini-games (e.g., the "Gandalf's Rocket" game) in the content navigation console 406, however, is activated (e.g., unlocked, ungrayed, etc.), or authorized for access by the online player account 471

In some embodiments, the system 400 can incorporate statistics into non-wagering game content. For example, as described previously, the system 400 presents non-wagering game content based on statistics for the wagering game of the wagering game theme. For instance, the system 400 presents on a graphical map 420 progress points that were earned by game achievements during the themed wagering game or during previous non-wagering game sessions. In some embodiments, the system 400 can also present indicators on the graphical map 420 that highlight a player's statistics in a wagering game (e.g., a number of times that a player played the themed wagering game, a best win, an amount won, etc.). For example, the system 400 can present wagering game statistics on the graphical map 420 as elevated displays in association with a particular progress point. In some embodiments, the system 400 can use the statistics to generate advertisements, promotions, bonuses, etc. that the system 400 can present in the gaming widget 404 (e.g. in association with a progress point, as an advertisement during game play, etc.). The progress points on the map 420 can respond to mouse movements that cause an elevated presentation (e.g., a hover over display) that shows, for example, game statistics from primary games such as a number of spins, statistics for a number of times a player decided to play a particular bonus, a visual or graphical representation of a player's best win (e.g., a video replay of a player's wagering game achievement), achievements (e.g., medals, trophies, badges, etc.) won during the wagering game or during the non-wagering game, etc.

Returning momentarily to FIG. 3, the flow 300 continues at processing block 306, where the system detects a selection from the list of non-wagering games and provides non-wagering game content via the web widget based on the selection. For example, in FIG. 5, the gaming widget 404 presents, in the content display 405, a mechanism that indicates game status ("game status indication mechanism"), such as on a meter, a chart, a graph, a clock, a panel, a graphic, a map, etc., such as the graphical map 420 which indicates playing status (e.g., game status, game progress, etc.) for both the wagering game theme and non-wagering game content associated with the wagering game theme as part of a persistent-state, game experience that tracks game activity between a casino game and a widget game (e.g., the widget gaming experience on the webpage 403). In some embodiments, the status of a persistent-state game may be indicated by a series of game play status indicators ("game status indicators") (e.g., game status markers, game progress points, etc.). For instance, in an example of the graphical map 410, game play status indicators may take the form of progress points (e.g., miles, leagues, waypoints, etc.) along a path. One of the progress points indicates a current-state progress point 430 for the persistent-state game. When the online player account 471 reaches a certain game status (e.g., reaches certain progress points on the graphical map 420), the player receives certain rewards. The system 400 can provide game status indicators (e.g., progress points) for game play for the wagering game related to the wagering game theme as well as for game play in any of the mini-games listed in the content navigation console 406 for the wagering game theme. The gaming widget 404 can also present a message 427 for the player when the player logs in indicating a current state for the persistent-state gaming experience.

Figure 6:
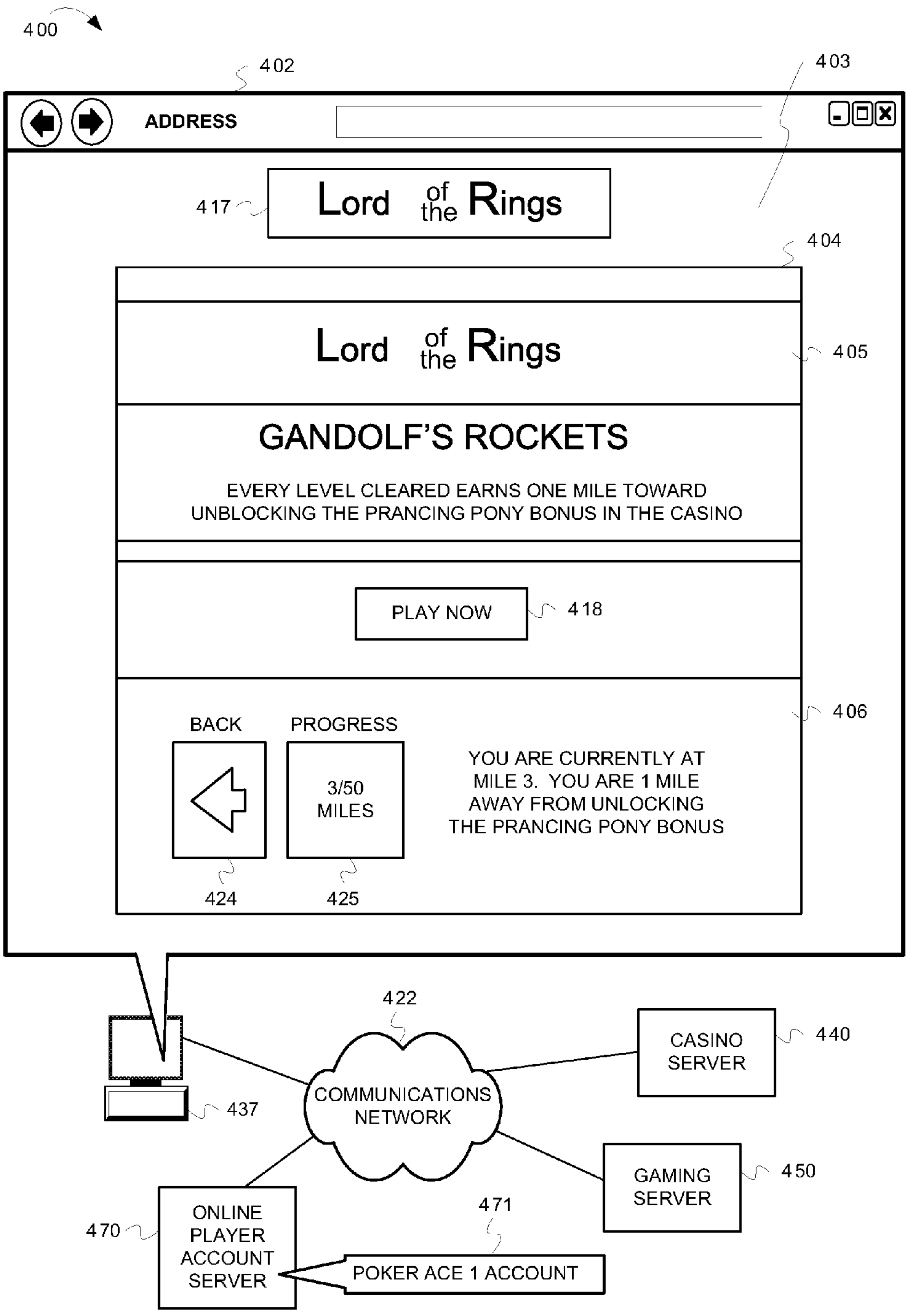
Figure 7:
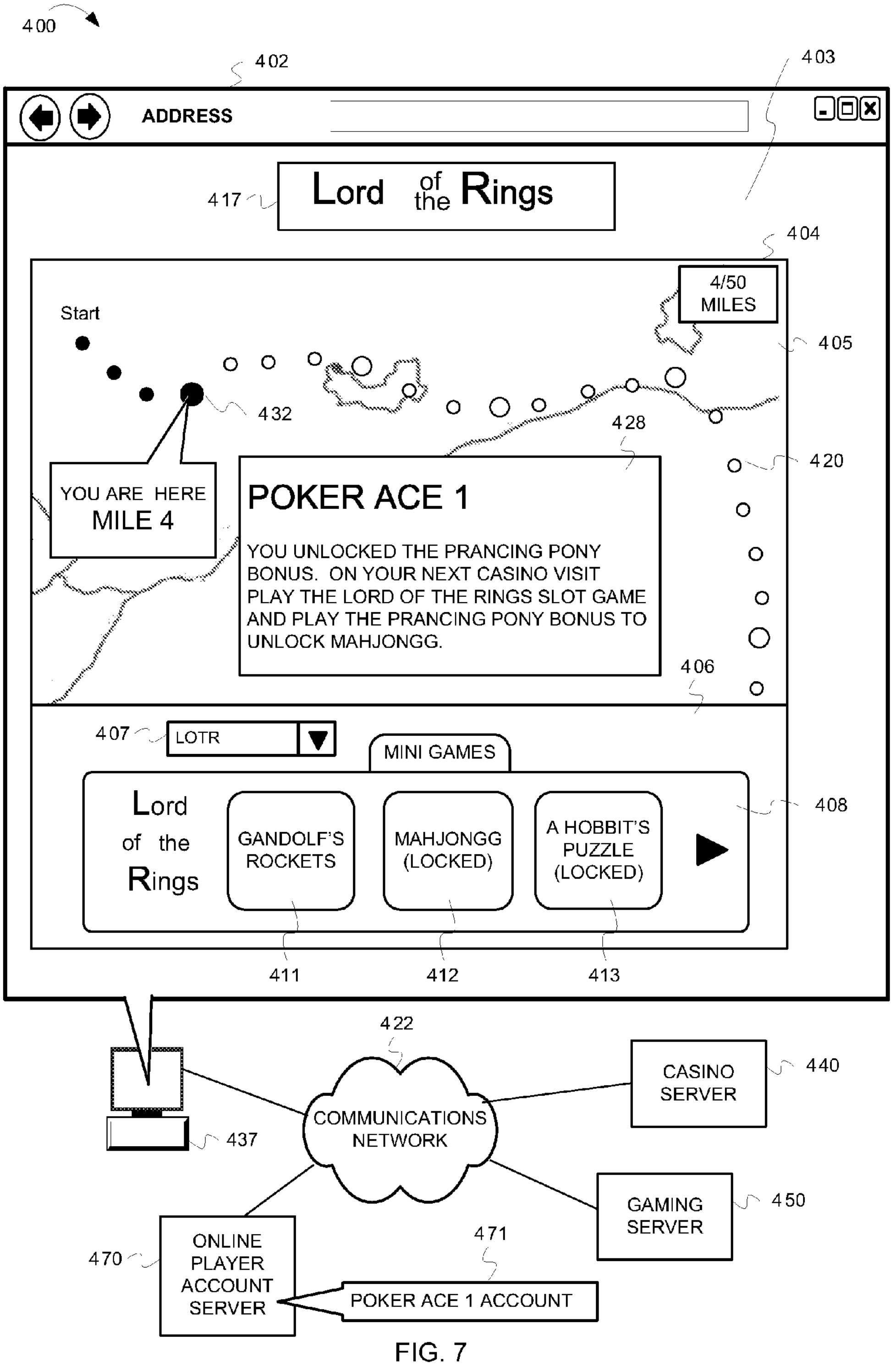

When a player selects a non-wagering content from the content navigation console 406, the gaming widget 404 can change appearance, as illustrated in FIG. 6. In FIG. 6, the gaming widget 404 presents game content in the content display 405 (e.g., a game title, a start control 418, and game play elements that appear in the content display 405 after a player activates the start control 418). The gaming widget 404 can also change the appearance of the content navigation console 406 to show game status information 425, messages, buttons (e.g., a back button 424 to exit game play), or other information.

Returning momentarily to FIG. 3, the flow 300 continues at processing block 308, where the system detects a game play achievement in the non-wagering game content and stores an indication of the game play achievement with the player account. For example, in FIG. 7, the gaming server 450 tracks and stores progress of game play performed via the gaming widget 404. During game play, the online player account 471 can attain game play achievements (e.g., complete tasks, solve puzzles, find objects, pass levels, etc.). The gaming server 450 detects the game play achievements and assigns a number of awards and/or game status indicators for the game play achievements. The gaming server 450 saves an indication of the game play achievements to the online player account 471. The gaming server 450 can further modify the game status indication mechanism (e.g., the graphical map 420) to present the number of awards and/or game status indicators (e.g., present a number of progress points on a path). For example, a new current-state progress point 432 indicates that the online player account 471 has progressed along the path of the graphical map 420. An additional message 428 can indicate that based on the player's performance in the non-wagering game, the player unlocked wagering game content (e.g., the "Prancing Pony" bonus game) that is only available when the player plays the themed wagering game (e.g., the Lord of the Rings slot game) at a casino. At any subsequent time, the online player account 471 can log in again to the gaming widget 404, whether at the webpage 403, at another website, at a wagering game machine, etc., and the system 400 can provide the game status indication mechanism (e.g., the graphical map 420) and show progress the online player account 471 has made.

The flow 300 continues at processing block 310, where the system determines a host-provided reward for the game play achievement and provides the host-provided reward to the player account. For example, the system can detect a setting for a casino's subscriber account ("casino subscription account"). The setting indicates one or more rewards that the online player account can receive attaining an achievement and/or for attaining a specific game status indicator (e.g., a progress point) for the one of non-wagering games. The system can determine and use a player's loyalty program status level in selecting a reward specific to the player account. The system can also award game status indicators (e.g., progress points) in addition to, or instead, rewards. In some embodiments, the system can provide player loyalty points as a reward.

Additional Example Embodiments

According to some embodiments, a wagering game system ("system") can provide various example devices, operations, etc., to control interactivity between bingo games and additional wagering games. The following non-exhaustive list enumerates some possible embodiments.

- In some embodiments, the system can present messages, notifications, advertisements (ads), promotions, etc. from a host entity, an online gaming service, a player, etc. via a gaming widget. For example, in FIG. 4, when a player logs in via the content display 405, the content display can present a notification saying that a casino host (e.g., Casino X that hosts the website 403 via the casino server 440) will receive, or has received, new slot games. The notification may be targeted to the player account based on information about the player account, player account history, or information on the gaming widget 404. For example, the system 400 can detect the indication of a selected game theme for the webpage 403 (e.g., detect that the Lord of the Rings game theme is selected via the game theme selector 407), and the system 400 can present a notification of a new slot game that Casino X may be receiving that is related to the selected game theme (e.g. a new slot game called "The Twin Towers" which may be related to the Lord of the Rings game theme). In some embodiments, the system 400 can present interstitials (e.g., notifications, advertisements, etc.) indicated by a casino operator or administrative account. The system 400 can detect the interstitials and present them on the webpage 403 or in the gaming widget 404. The system 400 can pass a command to the gaming widget via an API to present the interstitial in the gaming widget 404. In some embodiments, the system 400 can delay presentation of content in the gaming widget 404 while the interstitial plays in a separate section of the webpage 403 or on top of (layered over) part or all of the gaming widget 404. In some embodiments, the system 400 can present player community information related to the online game service in the gaming widget 404. In other embodiments, the system 400 can present a tour of benefits before a player registers for a player account in the gaming widget 404. In some embodiments, the system 400 can provide social interaction or communication via the gaming widget 404. For instance, the system 400 can send a notification between a player logged on to an online player account via a gaming widget and a separate player logged on to a casino player account at a wagering game machine. The notification can indicate chat communications, invitations to play group wagering games together, etc.
- In some embodiments, the system can provide group gaming capabilities via a gaming widget. For example, the system can detect a selection of a community wagering game from the gaming widget by a first player account. The system can send a notification to an additional player account (e.g., a social contact of the first player account, an anonymous player, a group or team of players, etc.). The system can further present the community wagering game content in the gaming widget along with gaming controls, menus, etc. to control community wagering game play and present gaming statistics via the gaming widget.
- In some embodiments, the system can present an administrative console, controllable by the gaming service provider, (e.g., via an online gaming server that provides the game content service) and/or by the host entity (e.g., via an operator level server). The administrative console can control some customized, or host-specific, information that appears in the gaming web widget, including types of wagering game themes that the host entity has purchased or subscribed to, types of non-wagering game content related to the wagering game themes, features or options within a specific theme that the host entity has subscribed to within a specific game, host specific branding or customization of look and feel of a gaming widget, host specific graphics to insert into a background of a webpage, host specific advertisements/promotions, host specific bonuses, etc. The administrative console can include controls, for example, that an operator can use to define bonuses that are available for game achievements that a player obtains via gaming and non-gaming player via the gaming widget. In some embodiments, the system can provide controls, via the administrative console, that an operator can use to set levels of bonuses that are based on specific levels of player information (e.g., levels of player status, levels of player game history, etc.). In some embodiments, the system can detect the specific levels of player information from the online gaming service and or dynamically determine during game play, specific bonuses that correspond to the player information. The online gaming service can automatically update, or customize, the reward to be consistent with the specific levels of player information (e.g., consistent with player's status level). In some embodiments, the administrative console can provide capabilities for operators to define custom trophies or achievement awards for a non-wagering game.

- In some embodiments, the system can provide a forum, or venue, for swapping or selling trophies via a gaming widget.
- In some embodiments, the system can provide reports on player activity and data mining or marketing services related to wagering game statistics for game play on common wagering game across multiple casinos. The system can provide account information (e.g., playing history, game statistics, etc.) for an online player account to a marketing server associated with a specific casino or casino network. The marketing server can use the account information to generate marketing content (e.g., promotions, coupons, advertisements, etc.). The system can present the marketing content via the gaming widget.
- In some embodiments, the system can present aggregated data from multiple players in a gaming widget, such as showing a "top 10" points earner and/or showing a logged in player's placement within the aggregate.
- In some embodiments, the system can present a points-based economy where non-monetary points can be earned and spent within the casino, or online, via gaming widgets. The points can be traded for various items, for example, items that can change a look and feel of a slot machine.
- In some embodiments, the system can allow players to download, via a gaming widget, non-monetary items of interest, such as screen savers, wallpaper, pictures, videos of a last big win, etc. and present them via a gaming widget.
- In some embodiments, the system can display a game locator on a gaming widget so that a person accessing the gaming widget can find a slot game nearest to the person.
- In some embodiments, the system can initiate a registration of an online player account, via a registration process with a gaming widget, in a casino and incentivize a player to access a website to complete the registration process. For example, the system can unlock a non-wagering game when a player registers for the online player account at the casino to incentivize the player to access the online casino account via the gaming widget. In other embodiments, the system can initiate a registration of an online player account online and incentivize the player to access a gaming widget at a casino.
- In some embodiments, the system can present multiple widgets with multiple functions within multiple pages of one or more websites.
- In some embodiments, the system can communicate widget content and non-widget content via an API for a gaming widget, for a gaming service, etc., to another widget, to a website, to a wagering game machine, etc. For example a wagering game provider can provide a gaming widget and other files, objects, messages, displays, etc. on a webpage in addition to one or more widgets. The widgets, files, objects, messages, etc. can be customized for a host entity and can communicate via an API provided by the wagering game provider.
- In some embodiments, the system can also unlock, or authorize access to, various types of widget content, in addition to unlocking non-wagering games, based on gaming history (e.g., based on attaining threshold statistics in a wagering game). Examples of widget content that the system can unlock may include specific social communication capabilities to perform via a gaming widget, access to promotional content via a gaming widget, special account privileges for an online player account that can login via a gaming widget, invitations to gaming events via the gaming widget, abilities to customize the gaming widget (e.g., select skin color, background graphics, fonts, etc.).
- In some embodiments, the system can provide multiple widgets that a host can present. Some widgets can be gaming widgets. Some widgets can perform separate or distinct functions from each other, although some, or all, of the multiple widgets can communicate with the gaming service provided (e.g., the widget content provider) to present content relevant to one player account logged. For example, the system can present multiple widgets on a webpage, and each can present content specific to the player account (e.g., one widget presents game content that the player account is authorized to access, a separate widget presents a leaderboard that highlights the player account's position on the leaderboard, etc.) although the player account may have logged in via only one of the widgets.

Additional Example Operating Environments

This section describes example operating environments, systems and networks, and presents structural aspects of some embodiments.

Computer System

Figure 8:
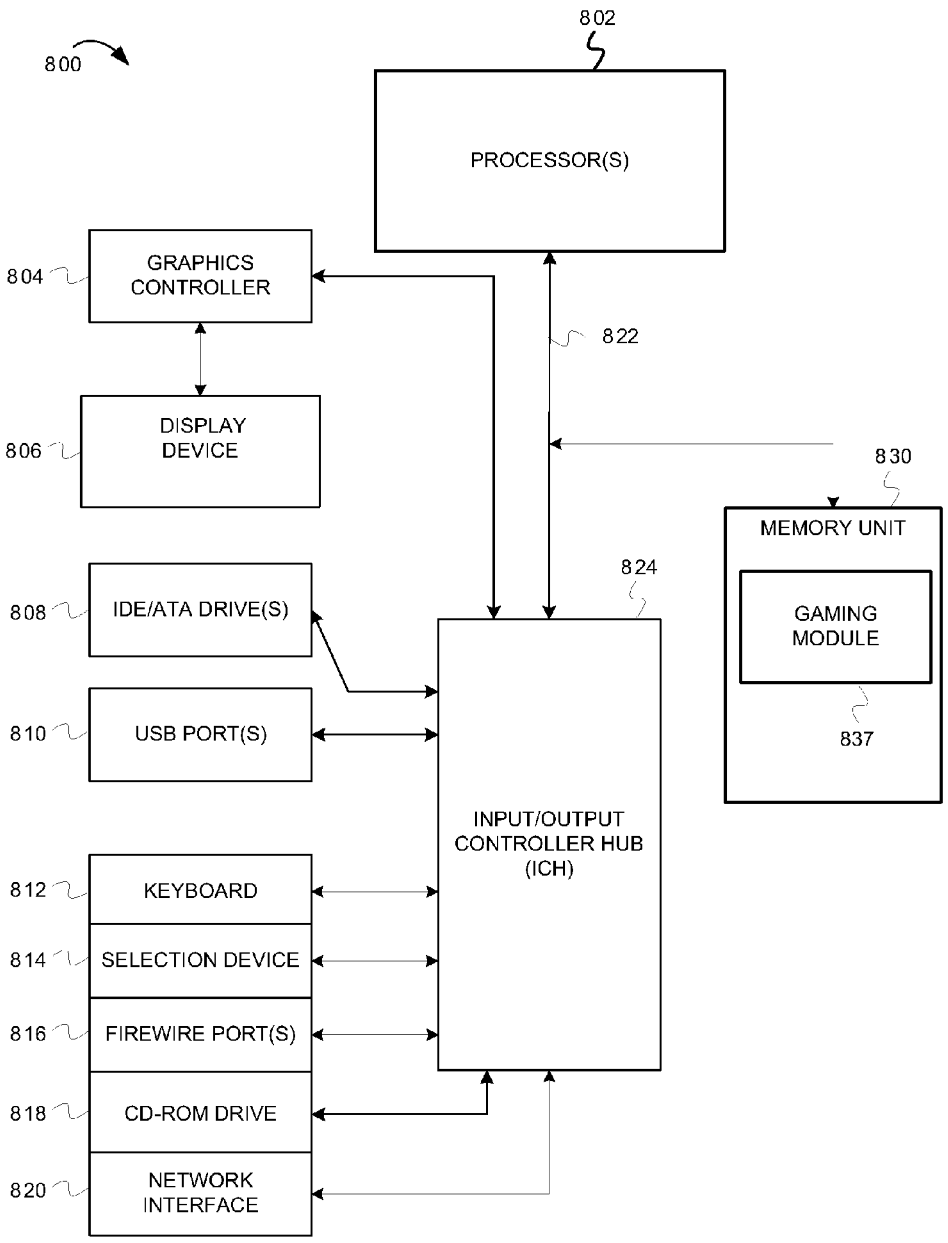
FIG. 8 is an illustration of a computer system 800, according to some embodiments.

FIG. 8 is a conceptual diagram that illustrates an example of a computer system 800, according to some embodiments. In FIG. 8, the wagering game computer system ("computer system") 800 may include a processor unit 802, a memory unit 830, a processor bus 822, and an Input/Output controller hub (ICH) 824. The processor unit 802, memory unit 830, and ICH 824 may be coupled to the processor bus 822. The processor unit 802 may comprise any suitable processor architecture. The computer system 800 may comprise one, two, three, or more processors, any of which may execute a set of instructions in accordance with some embodiments.

The memory unit 830 may also include an I/O scheduling policy unit and I/O schedulers. The memory unit 830 can store data and/or instructions, and may comprise any suitable memory, such as a dynamic random access memory (DRAM), for example. The computer system 800 may also include one or more suitable integrated drive electronics (IDE) drive(s) 808 and/or other suitable storage devices. A graphics controller 804 controls the display of information on a display device 806, according to some embodiments.

The input/output controller hub (ICH) 824 provides an interface to I/O devices or peripheral components for the computer system 800. The ICH 824 may comprise any suitable interface controller to provide for any suitable communication link to the processor unit 802, memory unit 830 and/or to any suitable device or component in communication with the ICH 824. The ICH 824 can provide suitable arbitration and buffering for each interface.

For one embodiment, the ICH 824 provides an interface to the one or more IDE drives 808, such as a hard disk drive (HDD) or compact disc read only memory (CD ROM) drive, or to suitable universal serial bus (USB) devices through one or more USB ports 810. For one embodiment, the ICH 824 also provides an interface to a keyboard 812, selection device 814 (e.g., a mouse, trackball, touchpad, etc.), CD-ROM drive 818, and one or more suitable devices through one or more firewire ports 816. For one embodiment, the ICH 824 also provides a network interface 820 though which the computer system 800 can communicate with other computers and/or devices.

The computer system 800 may also include a machine-readable storage medium that stores a set of instructions (e.g., software) embodying any one, or all, of the methodologies for provide and control embeddable gaming content. Furthermore, software can reside, completely or at least partially, within the memory unit 830 and/or within the processor unit 802. The computer system 800 can also include a gaming module 837. The gaming module 837 can process communications, commands, or other information, to provide and control embeddable gaming content. Any component of the computer system 800 can be implemented as hardware, firmware, and/or machine-readable storage media including instructions for performing the operations described herein.

Personal Wagering Game System

Figure 9:
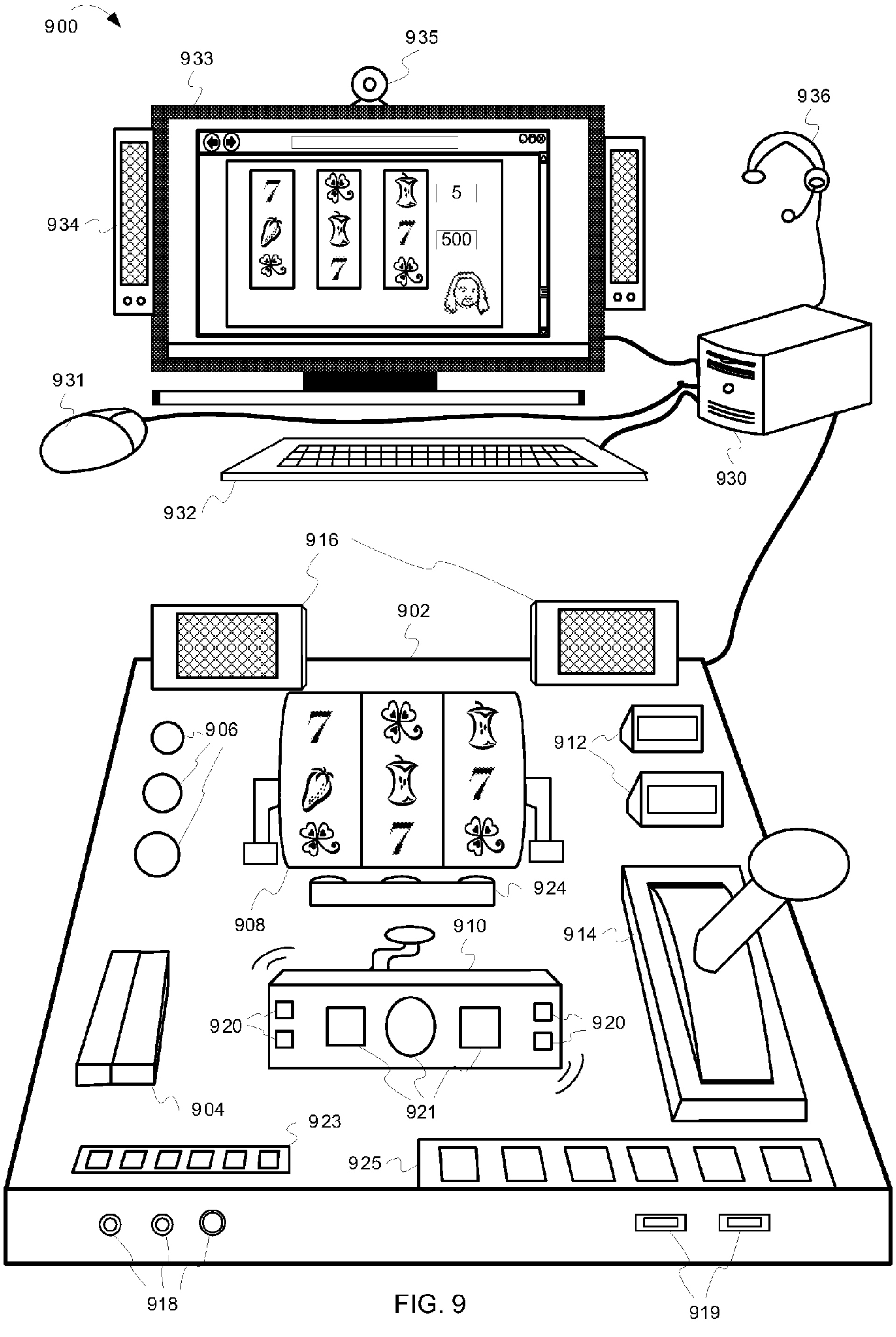
FIG. 9 is an illustration of a personal wagering game system 900, according to some embodiments.

FIG. 9 is a conceptual diagram that illustrates an example of a personal wagering game system 900, according to some embodiments. In FIG. 9, the personal wagering game system ("system") 900 includes an exemplary computer system 930 connected to several devices, including user input devices (e.g., a keyboard 932, a mouse 931), a web-cam 935, a monitor 933, speakers 934, and a headset 936 that includes a microphone and a listening device. In some embodiments, the webcam 935 can detect fine details of a person's facial features, from an eye-level perspective. The web-cam 935 can use the fine detail to determine a person's identity, their demeanor, their facial expressions, their mood, their activities, their eye focus, etc. The headset 936 can include biometric sensors configured to detect voice patterns, spoken languages, spoken commands, etc. The biometric sensors in the web-cam 935 can detect colors (e.g., skin colors, eye colors, hair colors, clothing colors, etc.) and textures (e.g., clothing material, scars, etc.). The biometric sensors in the web-cam 935 can also measure distances between facial features (e.g., distance between eyes, distance from eyes to nose, distance from nose to lips, length of lips, etc.). The system 900 can generate a facial and body map using the detected colors, textures, and facial measurements. The system 900 can use the facial and body map to generate similar facial features and body appearances for a player account avatar. Also connected to the computer system 930 is a gaming control device ("gaming pad") 902 including wagering game accoutrements associated with wagering games. The wagering game accoutrements include one or more of prop reels 908, prop game meters 912, indicators 906, a game control device 910, a physical lever 914, a magnetic card reader 904, a video projection device 924, input/output ports 918, USB ports 919, and speakers 916. The gaming pad 902 can present feedback of online activities. For instance, the gaming pad 902 can use vibrations and signals on the gaming control device (e.g., the game control device 910 or the physical lever 914 can vibrate to indicate a back pat from another player or a game celebration, the indicators 906 can blink, etc.). The physical lever 914 can produce feelings in the lever to emulate a pulling feel or a vibration. The video projection device 924 can project video onto the prop reels 908 so that the prop reels 908 can present many different types of wagering games. The prop reels 908 can spin when the physical lever 914 is pulled. The video projection device 924 can project reel icons onto the prop reels 908 as they spin. The video projection device 924 can also project reel icons onto the prop reels 908 when the prop reels 908 are stationary, but the imagery from the video project device 924 makes the prop reels 908 appear to spin. The magnetic card reader 904 can be used to swipe a credit card, a player card, or other cards, so that the system can quickly get information. The system 900 can offer lower rates for using the magnetic card reader 904 (e.g., to get a lower rate per transaction). The game control device 910 can include an emotion indicator keypad with keys 920 that a player can use to indicate emotions. The game control device 910 can also include biometric devices 921 such as a heart-rate monitor, an eye pupil dilation detector, a fingerprint scanner, a retinal scanner, voice detectors, speech recognition microphones, motion sensors, sound detectors, etc. The biometric devices 921 can be located in other places, such as in the headset 936, within a chair (not shown), within personal control devices (e.g. joysticks, remote controls, game pads, roller-balls, touch-pads, touch-screens, etc.), within the web-cam 935, or any other external device. The external devices can be connected to the computer 930 or to the game control device 910 via the input/output ports 918. As a security feature, some biometric devices can be associated with some of the gaming pad devices (e.g., the magnetic card reader 904), such as a fingerprint scanner, a retinal scanner, a signature pad to recognize a player's signature, etc. The game control device 910 can also use the keys 920 to share items and control avatars, icons, game activity, movement, etc. within a network wagering venue. The game pad can also have an electronic (e.g., digital) button panel 925, an electronic control panel 923, or any other type of changeable panel that can change appearance and/or configuration based on the game being played, the action being performed, and/or other activity presented within an online gaming venue. The game control device 910 can also move in different directions to control activity within the online gaming venue (e.g., movement of a player's avatar moves in response to the movements of the game control device 910). Avatars can be pre-programmed to act and look in certain ways, which the player can control using the system 900. The gaming pad 902 can permit the player to move the avatar fluidly and more easily than is possible using a standard keyboard. The system 900 can cause an avatar to respond to input that a player receives via the gaming pad 902. For example, a player may hear a sound that comes primarily from one direction (e.g., via stereophonic signals in the headset 936) within the network wagering venue. The system 900 can detect the movement of the player (e.g., the system 900 detects that a player moves his head to look in the direction of the sound, the player uses the game control device 910 to move the avatar's perspective to the direction of the sound, etc.). The system 900 can consequently move the avatar's head and/or the avatar's perspective in response to the player's movement. The player can indicate an expression of an emotion indicated by the player using the keys 920. The system 900 can make the avatar's appearance change to reflect the indicated emotion. The system 900 can respond to other movements or actions by the player and fluidly move the avatar to respond. The system 900 can also interpret data provided by the biometric devices and determine expressions and/or indications of emotions for a player using the system 900.

Wagering Game Machine Architecture

Figure 10:
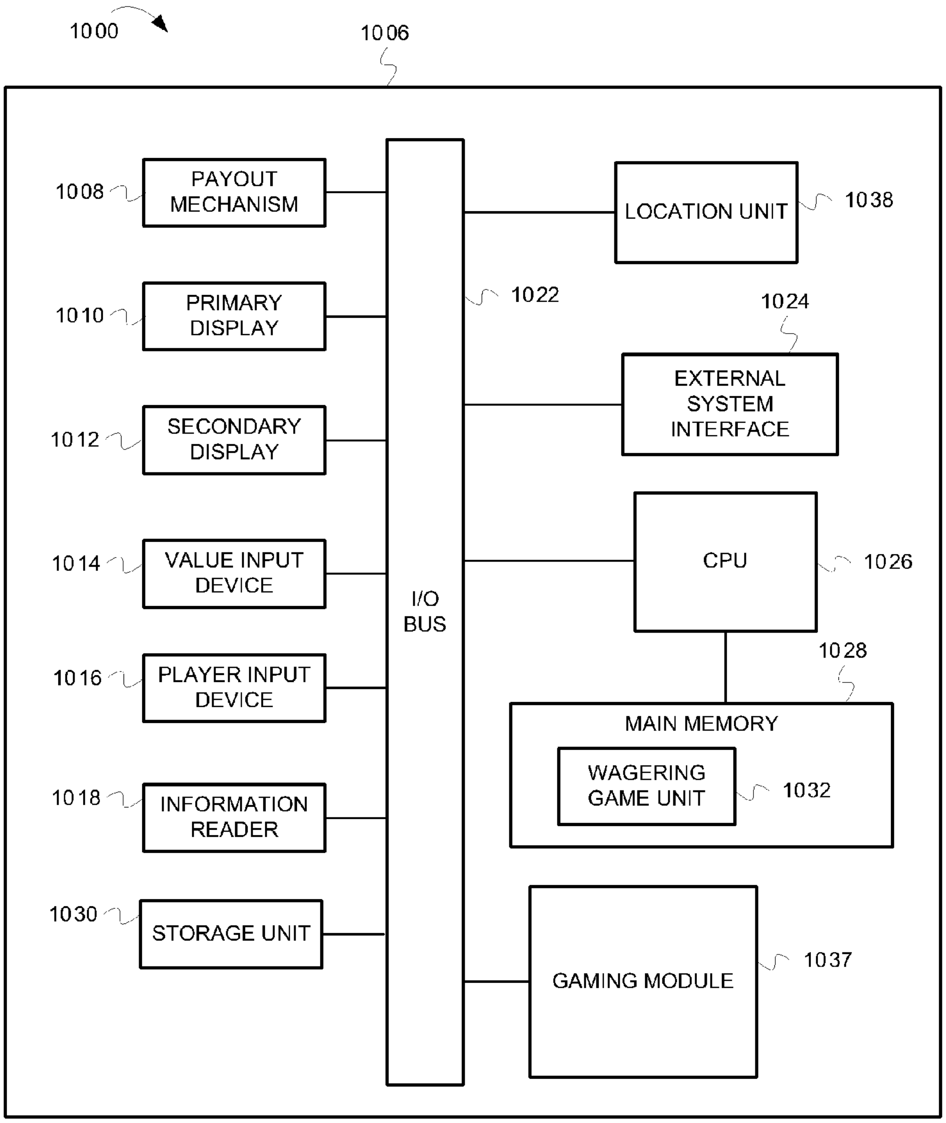
FIG. 10 is an illustration of a wagering game machine architecture 1000, according to some embodiments.

FIG. 10 is a conceptual diagram that illustrates an example of a wagering game machine architecture 1000, according to some embodiments. In FIG. 10, the wagering game machine architecture 1000 includes a wagering game machine 1006, which includes a central processing unit (CPU) 1026 connected to main memory 1028. The CPU 1026 can include any suitable processor, such as an Intel® Pentium processor, Intel® Core 2 Duo processor, AMD Opteron™ processor, or UltraSPARC processor. The main memory 1028 includes a wagering game unit 1032. In some embodiments, the wagering game unit 1032 can present wagering games, such as video poker, video black jack, video slots, video lottery, reel slots, etc., in whole or part.

The CPU 1026 is also connected to an input/output ("I/O") bus 1022, which can include any suitable bus technologies, such as an AGTL+frontside bus and a PCI backside bus. The I/O bus 1022 is connected to a payout mechanism 1008, primary display 1010, secondary display 1012, value input device 1014, player input device 1016, information reader 1018, and storage unit 1030. The player input device 1016 can include the value input device 1014 to the extent the player input device 1016 is used to place wagers. The I/O bus 1022 is also connected to an external system interface 1024, which is connected to external systems (e.g., wagering game networks). The external system interface 1024 can include logic for exchanging information over wired and wireless networks (e.g., 802.11g transceiver, Bluetooth transceiver, Ethernet transceiver, etc.)

The I/O bus 1022 is also connected to a location unit 1038. The location unit 1038 can create player information that indicates the wagering game machine's location/movements in a casino. In some embodiments, the location unit 1038 includes a global positioning system (GPS) receiver that can determine the wagering game machine's location using GPS satellites. In other embodiments, the location unit 1038 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 10, in some embodiments, the location unit 1038 is not connected to the I/O bus 1022.

In some embodiments, the wagering game machine 1006 can include additional peripheral devices and/or more than one of each component shown in FIG. 10. For example, in some embodiments, the wagering game machine 1006 can include multiple external system interfaces 1024 and/or multiple CPUs 1026. In some embodiments, any of the components can be integrated or subdivided.

In some embodiments, the wagering game machine 1006 includes a gaming module 1037. The gaming module 1037 can process communications, commands, or other information, where the processing can provide and control embeddable gaming content.

Furthermore, any component of the wagering game machine 1006 can include hardware, firmware, and/or machine-readable storage media including instructions for performing the operations described herein.

Wagering Game Machine

Figure 11:
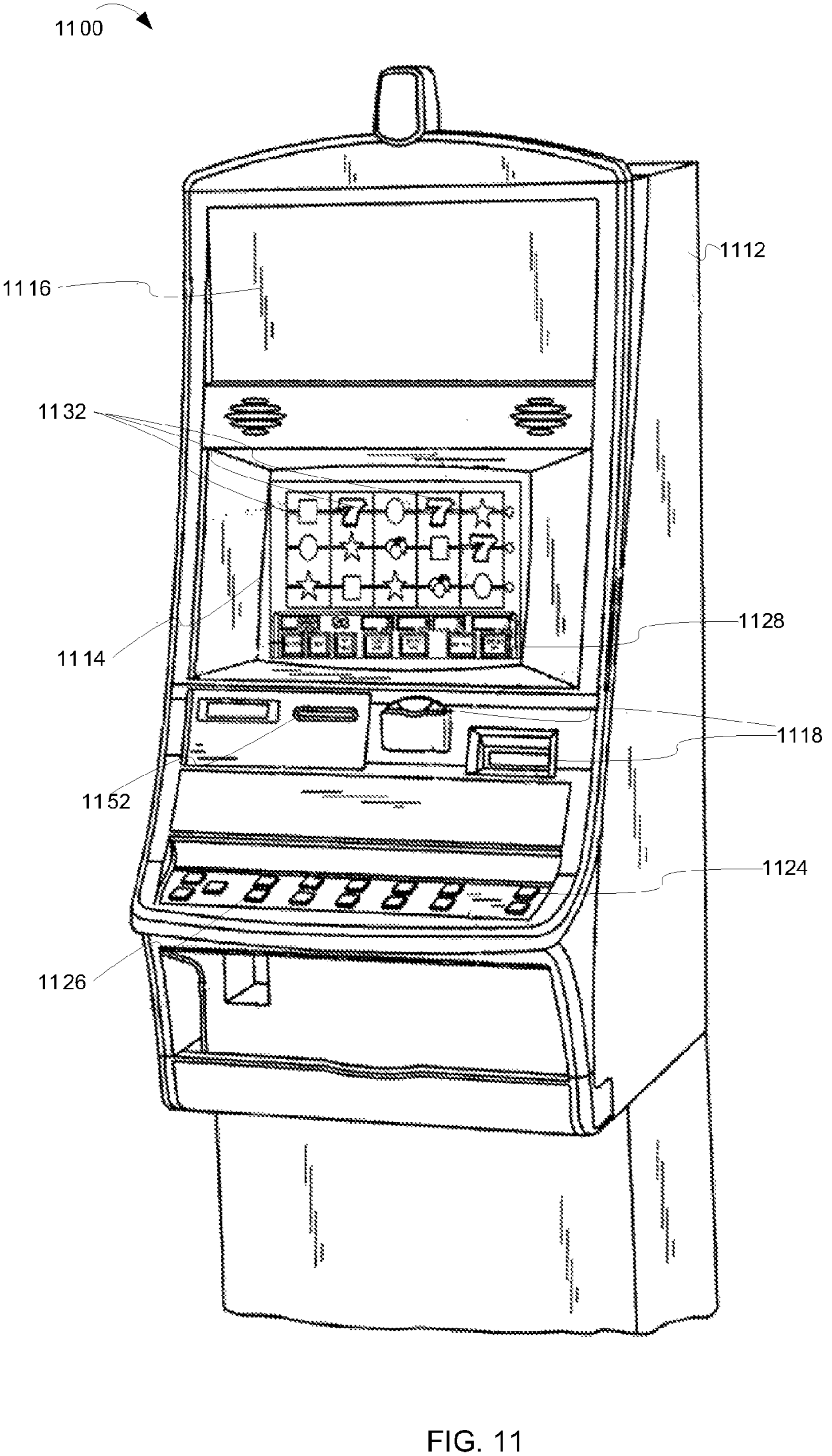
FIG. 11 is an illustration of a wagering game machine 1100, according to some embodiments.

FIG. 11 is a conceptual diagram that illustrates an example of a wagering game machine 1100, according to some embodiments. Referring to FIG. 11, the wagering game machine 1100 can be used in gaming establishments, such as casinos. According to some embodiments, the wagering game machine 1100 can be any type of wagering game machine and can have varying structures and methods of operation. For example, the wagering game machine 1100 can be an electromechanical wagering game machine configured to play mechanical slots, or it can be an electronic wagering game machine configured to play video casino games, such as blackjack, slots, keno, poker, blackjack, roulette, etc.

The wagering game machine 1100 comprises a housing 1112 and includes input devices, including value input devices 1118 and a player input device 1124. For output, the wagering game machine 1100 includes a primary display 1114 for displaying information about a basic wagering game. The primary display 1114 can also display information about a bonus wagering game and a progressive wagering game. The wagering game machine 1100 also includes a secondary display 1116 for displaying wagering game events, wagering game outcomes, and/or signage information. While some components of the wagering game machine 1100 are described herein, numerous other elements can exist and can be used in any number or combination to create varying forms of the wagering game machine 1100.

The value input devices 1118 can take any suitable form and can be located on the front of the housing 1112. The value input devices 1118 can receive currency and/or credits inserted by a player. The value input devices 1118 can include coin acceptors for receiving coin currency and bill acceptors for receiving paper currency. Furthermore, the value input devices 1118 can include ticket readers or barcode scanners for reading information stored on vouchers, cards, or other tangible portable storage devices. The vouchers or cards can authorize access to central accounts, which can transfer money to the wagering game machine 1100.

The player input device 1124 comprises a plurality of push buttons on a button panel 1126 for operating the wagering game machine 1100. In addition, or alternatively, the player input device 1124 can comprise a touch screen 1128 mounted over the primary display 1114 and/or secondary display 1116.

The various components of the wagering game machine 1100 can be connected directly to, or contained within, the housing 1112. Alternatively, some of the wagering game machine's components can be located outside of the housing 1112, while being communicatively coupled with the wagering game machine 1100 using any suitable wired or wireless communication technology.

The operation of the basic wagering game can be displayed to the player on the primary display 1114. The primary display 1114 can also display a bonus game associated with the basic wagering game. The primary display 1114 can include a cathode ray tube (CRT), a high resolution liquid crystal display (LCD), a plasma display, light emitting diodes (LEDs), or any other type of display suitable for use in the wagering game machine 1100. Alternatively, the primary display 1114 can include a number of mechanical reels to display the outcome. In FIG. 11, the wagering game machine 1100 is an "upright" version in which the primary display 1114 is oriented vertically relative to the player. Alternatively, the wagering game machine can be a "slant-top" version in which the primary display 1114 is slanted at about a thirty-degree angle toward the player of the wagering game machine 1100. In yet another embodiment, the wagering game machine 1100 can exhibit any suitable form factor, such as a free standing model, bar top model, mobile handheld model, or workstation console model.

A player begins playing a basic wagering game by making a wager via the value input device 1118. The player can initiate play by using the player input device's buttons or touch screen 1128. The basic game can include arranging a plurality of symbols 1132 along a pay line, which indicates one or more outcomes of the basic game. Such outcomes can be randomly selected in response to player input. At least one of the outcomes, which can include any variation or combination of symbols, can trigger a bonus game.

In some embodiments, the wagering game machine 1100 can also include an information reader 1152, which can include a card reader, ticket reader, bar code scanner, RFID transceiver, or computer readable storage medium interface.

In some embodiments, the information reader 1152 can be used to award complimentary services, restore game assets, track player habits, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:

initiating, via at least one of one or more processors, a non-wagering game session in response to first user input via a gaming widget embedded in a webpage;

detecting a selection of a wagering game theme, via second user input from the gaming widget, wherein the wagering game theme is associated with wagering game content that was previously played during one or more wagering game sessions that occurred before the non-wagering game session;

detecting wagering game statistics for the wagering game content in response to the detecting the selection of the wagering game theme;

determining, via at least one of the one or more processors, non-wagering game content that is authorized to present based on the wagering game statistics and based on the selection of the wagering game theme; and providing the non-wagering game content for presentation via the gaming widget during the non-wagering game session.

2. The computer-implemented method of claim 1, wherein the detecting the selection of the wagering game theme includes providing a list of a plurality of wagering game themes for presentation via the gaming widget, and detecting the selection of the wagering game theme from the list via the second user input.

3. The computer-implemented method of claim 1, wherein the providing the non-wagering game content for presentation via the gaming widget comprises:

providing game selection graphics for presentation via the gaming widget, wherein the game selection graphics are for non-wagering games associated with the wagering game theme, and wherein the game selection graphics indicate that a player account, associated with both the non-wagering game session and the one or more wagering game sessions, is authorized to access at least one of the non-wagering games based on the wagering game statistics;

detecting a selection via the gaming widget of one of the game selection graphics for the at least one of the non-wagering games; and providing game play elements for the at least one of the non-wagering games for presentation via the gaming widget.

4. The computer-implemented method of claim 1 further comprising:

providing, for presentation via the gaming widget, an indication of game play status in a persistent-state game that tracks achievements for the wagering game content and for the non-wagering game content;

detecting occurrence of one of the achievements via play of the non-wagering game content;

storing an indication of the one of the achievements in a player account;

awarding a number of status indicators for the one of the achievements; and providing the number of status indicators for presentation via the gaming widget.

5. The computer-implemented method of claim 1, wherein the detecting the wagering game statistics comprises:

logging in a first player account using first user login information input via the gaming widget;

logging in a second player account, associated with the first player account, using second user login information input via the gaming widget;

authorizing the first player account to access the second player account; and retrieving the wagering game statistics from the second player account for the wagering game theme.

6. The computer-implemented method of claim 1, wherein the wagering game statistics are one or more of a number of plays of the wagering game content, a number of times a player played a bonus game associated with the wagering game content, and one or more winning events that occurred for the wagering game content.

7. The computer-implemented method of claim 1 further comprising:

determining an advertisement pertinent to the wagering game statistics; and providing the advertisement for presentation via the gaming widget.

8. An apparatus comprising:

one or more processors; and a gaming services module configured to, via at least one of the one or more processors, initiate a non-wagering game session in response to first user input via a gaming widget embedded in a webpage, detect a selection, via second user input from the webpage, of a game theme associated with wagering game content that was played previously via a wagering game session, detect wagering game statistics for the wagering game content in response to the selection of the game theme, detect non-wagering game content authorized for access based on the wagering game statistics, wherein the non-wagering game content is associated with the game theme, customize the non-wagering game content based on settings for a subscriber account that subscribes to a gaming service that provides the non-wagering game content, and provide the non-wagering game content for presentation via the gaming widget during the non-wagering game session.

9. The apparatus of claim 8 wherein the gaming services module is further configured to detect that one of the settings that indicates at least one of a plurality of rewards for attaining a game achievement for the non-wagering game content, detect that the game achievement was attained during the non-wagering game session via play of the non-wagering game content via a player account, select the at least one of the plurality of rewards for the game achievement, and provide the at least one of the plurality of rewards to the player account.

10. The apparatus of claim 9, wherein the gaming services module is further configured to determine a player loyalty status level for an additional player account linked with the player account, and select the at least one of the plurality of rewards based on the player loyalty status level.

11. The apparatus of claim 9, wherein the gaming services module is configured to provide an indication of the at least one of the plurality of rewards for presentation via the gaming widget.

12. The apparatus of claim 8, wherein the gaming services module is further configured to select one or more of advertisement content, promotional content, and branding content based on the subscriber account and the wagering game statistics.

13. One or more non-transitory, machine-readable storage media having instructions stored thereon, which when executed by a set of one or more processors causes the set of one or more processors to perform operations comprising:

initiating a first game session in response to first user input via an online gaming widget;

detecting a selection of a game theme, via second user input from the online gaming widget, wherein the game theme is associated with one or more monetary-wagering games played via one or more second game sessions that initiated before the first game session;

detecting that one or more statistical thresholds were attained for the one or more monetary-wagering games;

determining one or more non-monetary-wagering games to provide based on the one or more statistical thresholds; and providing the one or more non-monetary-wagering games for presentation via the gaming widget via the first game session.

14. The one or more non-transitory, machine-readable storage media of claim 13, said operations further comprising customizing the one or more non-monetary-wagering games based on the one or more statistical thresholds.

15. The one or more non-transitory, machine-readable storage media of claim 14, wherein the operation for customizing the one or more non-monetary-wagering games based on the one or more statistical thresholds includes one or more operations comprising one or more of incorporating an indication of the one or more statistical thresholds into content for the one or more non-monetary-wagering games, indicating a level of progress in the one or more non-monetary-wagering games based on the one or more statistical thresholds, and unlocking elements of the one or more non-monetary-wagering games based on the one or more statistical thresholds.

16. The one or more non-transitory, machine-readable storage media of claim 13, wherein a first player account is associated with the first game session, and wherein a second player account, different from the first player account, is associated with the one or more second game sessions, and said operations further comprising accessing a game history for the second player account for the one or more monetary-wagering games.

17. The one or more non-transitory, machine-readable storage media of claim 13, wherein the one or more statistical thresholds comprise one or more of a number of plays of the one or more monetary-wagering games, a number of times a player played a bonus game associated with the one or more monetary-wagering games, and one or more winning events that occurred for the one or more monetary-wagering games.

18. The one or more non-transitory, machine-readable storage media of claim 13, wherein the online gaming widget is embedded in a webpage, and said operations further comprising modifying webpage content on the webpage according to the game theme.

19. The one or more non-transitory, machine-readable storage media of claim 18, wherein the operation of modifying the webpage content on the webpage includes operations comprising one or more of updating thematic web content on the webpage that indicates the game theme, updating content in one or more additional widgets presented on the webpage, and presenting one or more interstitial advertisements on the webpage.

20. A system comprising:

one or more processors; and one or more memory units configured to store instructions which, when executed by at least one of the one or more processors, cause the system to perform operations to initiate a first game session in response to first user input via an online gaming widget, detect a selection of a game theme, via second user input from the online gaming widget, wherein the game theme is associated with one or more monetary-wagering games played via one or more second game sessions that initiated before the first game session, detect that one or more accomplishments were achieved via the one or more monetary-wagering games, determine one or more non-monetary-wagering games to provide based on the one or more accomplishments, and provide the one or more non-monetary-wagering games for presentation via the online gaming widget via the first game session.

21. The system of claim 20, wherein the one or more memory units are configured to store instructions which, when executed by at least one of the one or more processors, cause the system to further perform one or more operations to customize the one or more non-monetary-wagering games based on the one or more accomplishments.

22. The system of claim 21, wherein the one or more operations to customize the one or more non-monetary-wagering games based on the one or more accomplishments includes one or more operations to one or more of incorporate an indication of the one or more accomplishments into content for the one or more non-monetary-wagering games, indicate a level of progress in the one or more non-monetary-wagering games based on the one or more accomplishments, and unlock elements of the one or more non-monetary-wagering games based on the one or more accomplishments.

23. The system of claim 20, wherein a first player account is associated with the first game session, and wherein a second player account, different from the first player account, is associated with the one or more second game sessions, and wherein the one or more memory units are configured to store instructions which, when executed by at least one of the one or more processors, cause the system to further perform operations to access a game history for the second player account for the one or more monetary-wagering games.

24. The system of claim 20, wherein the one or more accomplishments comprise one or more of a number of plays of the one or more monetary-wagering games, a number of times a player played a bonus game associated with the one or more monetary-wagering games, and one or more winning events that occurred for the one or more monetary-wagering games.

25. The system of claim 20, wherein the online gaming widget is embedded in a webpage, and wherein the one or more memory units are configured to store instructions which, when executed by at least one of the one or more processors, cause the system to further perform one or more operations to modify webpage content on the webpage according to the game theme.

26. The system of claim 25, wherein the one or more operations to modify the webpage content on the webpage includes one or more operations to one or more of update thematic web content on the webpage that indicates the game theme, update content in one or more additional widgets presented on the webpage, and present one or more interstitial advertisements on the webpage.

* * * * *